April 17, 1928.

C. M. OSTLER 1,666,830

SIFTER

Original Filed Jan. 22, 1923  2 Sheets-Sheet 1

Clarence M. Ostler
INVENTOR

BY Victor J. Evans
ATTORNEY

WITNESS:

April 17, 1928.
C. M. OSTLER
SIFTER
1,666,830
Original Filed Jan. 22, 1923  2 Sheets-Sheet 2
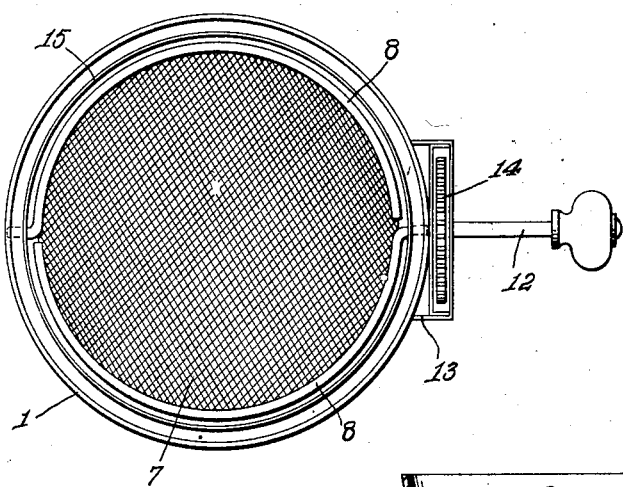
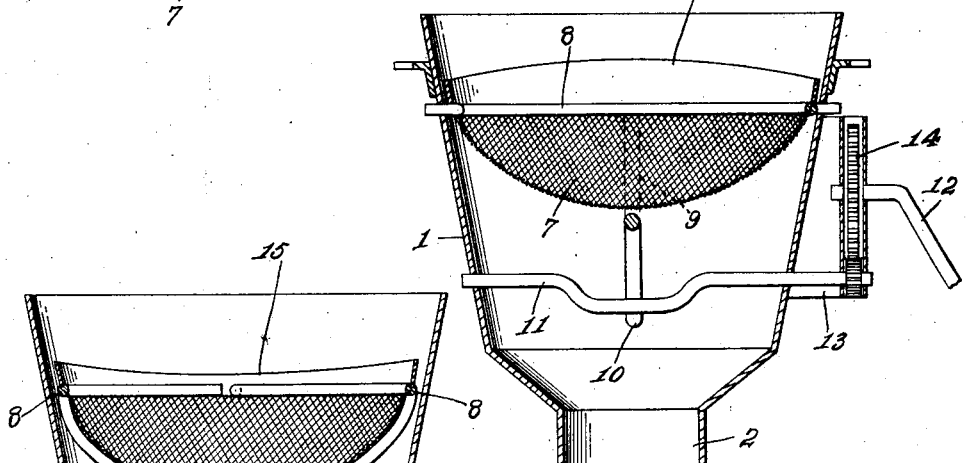
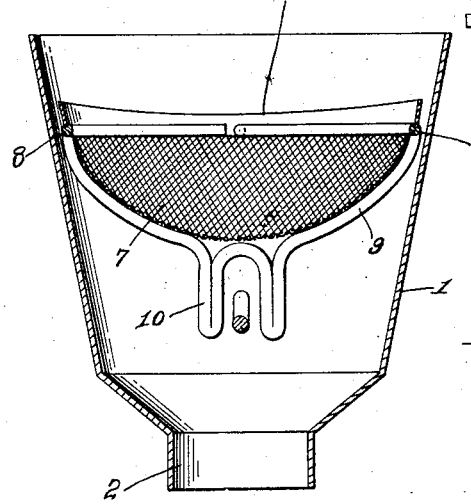
Clarence M. Ostler
INVENTOR
BY Victor J. Evans
ATTORNEY
WITNESS:

Patented Apr. 17, 1928.

1,666,830

UNITED STATES PATENT OFFICE.

CLARENCE M. OSTLER, OF FORT WAYNE, INDIANA, ASSIGNOR TO McCORMICK BROS. COMPANY, OF ALBANY, INDIANA.

SIFTER.

Application filed January 22, 1923, Serial No. 614,254. Renewed December 2, 1927.

This invention relates to a sifter, the general object of the invention being to provide means for causing the material to pass through the screen by a rocking movement of the screen and not by a rubbing action of a member on the screen, thus eliminating wear on the screen and pressure on the material.

Another object of the invention is to provide simple means for giving the screen its rocking or swinging movement.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a plan view of the sifter itself.

Figure 4 is a longitudinal sectional view.

Figure 5 is an end view.

Figure 1:
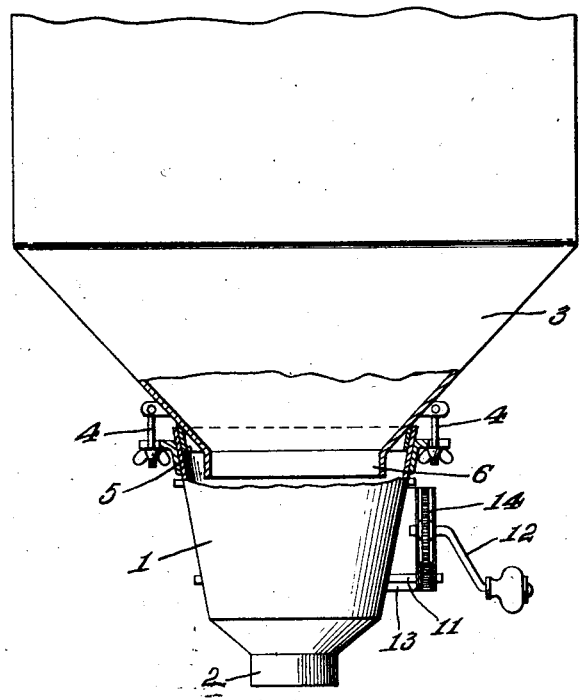
Figure 1 is a view partly in section showing the invention applied to a flour bin of a kitchen cabinet.
Figure 2:
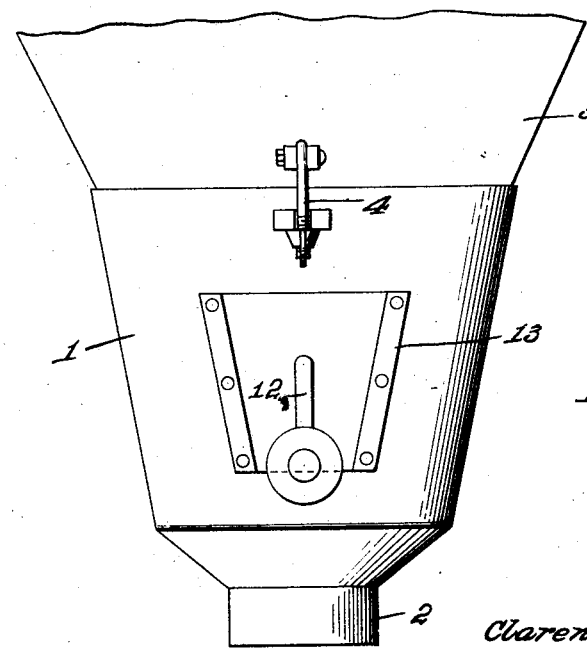
Figure 2 is a view taken at right angles from Figure 1.

In these views 1 indicates the sifter casing which is provided with a small discharge end 2 as usual and which is adapted to be connected with the discharge end of the bin 3 by the bolts and nuts 4, the upper end of the casing engaging a collar 5 on the bin and the outlet end 6 of the bin projecting into the casing. The screen 7 is of cup-shape and is carried by the two semi-circular shaped pieces 8, each of which has one end bent and passed through a hole in the casing to form a pivot, the pivots being diametrically opposite each other so that the screen can rock about a horizontal axis. A vertically arranged arc-shaped member 9 has its ends connected with the pieces 8 midway the ends of said pieces and a fork 10 is formed at the center of the member 9 by looping the said member. A crank shaft 11 is journaled in the casing 1 and the crank part thereof engages the fork 10 so that when the shaft is rotated a rocking movement will be given to the screen and its frame. As will be understood a crank handle 12 is journaled in the housing 13, secured to the casing 1, and this crank handle is geared to the crank shaft by means of the gears 14 which are located in the housing. Shields 15 are connected with the top part of the screen 3 and extend above the end 6 of the bin so as to keep the flour from falling between the screen and the sides of the casing.

It will thus be seen that when the crank handle 12 is turned the shaft will be rotated and its movement will impart a rocking movement to the screen frame so that the flour will be shaken through the sieve or screen without being pressed through by beaters or the like. This will improve the baking quality of the flour and also prevent wear of the sieve.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A sifter comprising a casing, semi-circular pieces arranged in opposed relation within the casing and each having one end bent at right angles to the body portion and passed through an opening in the casing to form a pivot point, a vertically disposed arc shaped member having its ends connected midway between the ends of the semi-circular pieces, a fork member formed in the arc member intermediate its ends, a crank shaft extending through the casing and having its crank portion disposed between the tangs of the forked portion, a cup shaped screen member supported by the semi-circular pieces and arc shaped member and manually operated means having connection with the crank shaft for imparting movement to the same whereby in turn to impart a rocking movement to the screen.

In testimony whereof I affix my signature.

CLARENCE M. OSTLER.